United States Patent
Park

(10) Patent No.: US 9,047,670 B2
(45) Date of Patent: Jun. 2, 2015

(54) METHOD AND APPARATUS FOR EXEMPLAR-BASED INPAINTING IN A MULTI-SCALED SPACE USING LAPLACIAN PYRAMID

(71) Applicant: Chung-Ang University Industry-Academy Cooperation Foundation, Seoul (KR)

(72) Inventor: Jae Hwa Park, Seoul (KR)

(73) Assignee: Chung-Ang University Industry-Academy Cooperation Foundation, Seoul (KR)

( * ) Notice: Subject to any disclaimer, the term of this patent is extended or adjusted under 35 U.S.C. 154(b) by 219 days.

(21) Appl. No.: 13/755,046

(22) Filed: Jan. 31, 2013

(65) Prior Publication Data

US 2014/0177974 A1    Jun. 26, 2014

(30) Foreign Application Priority Data

Dec. 26, 2012 (KR) .................. 10-2012-0153119

(51) Int. Cl.
*G06K 9/40* (2006.01)
*G06T 5/00* (2006.01)
*G06T 5/20* (2006.01)

(52) U.S. Cl.
CPC . *G06T 5/005* (2013.01); *G06T 5/20* (2013.01); *G06T 2207/20016* (2013.01)

(58) Field of Classification Search
None
See application file for complete search history.

(56) References Cited

U.S. PATENT DOCUMENTS

| | | | | |
|---|---|---|---|---|
| 5,488,674 A | * | 1/1996 | Burt et al. | 382/284 |
| 6,587,592 B2 | * | 7/2003 | Georgiev et al. | 382/254 |
| 7,558,433 B1 | * | 7/2009 | Georgiev | 382/254 |
| 7,889,947 B2 | * | 2/2011 | Ofek et al. | 382/294 |
| 2006/0257042 A1 | * | 11/2006 | Ofek et al. | 382/255 |
| 2008/0205785 A1 | * | 8/2008 | Geiger et al. | 382/260 |
| 2008/0253678 A1 | * | 10/2008 | Li et al. | 382/260 |
| 2008/0309662 A1 | * | 12/2008 | Hassner et al. | 345/419 |
| 2009/0154832 A1 | * | 6/2009 | Pham | 382/280 |
| 2010/0066874 A1 | * | 3/2010 | Ishiga | 348/252 |
| 2010/0177981 A1 | * | 7/2010 | Wang et al. | 382/260 |
| 2010/0296748 A1 | * | 11/2010 | Shechtman et al. | 382/254 |

(Continued)

FOREIGN PATENT DOCUMENTS

JP          2006-332785         12/2006
WO     WO 2009013696 A2 *   1/2009

OTHER PUBLICATIONS

"Fragment-Based Image Completion," Iddo Drori et al, SIGGRAPH(2003), pp. 303-312.*
"Merging images through pattern decomposition," Burt, P. J. et al Applications of Digital Image Processing VIII 575, 1985, pp. 173-181.*

(Continued)

*Primary Examiner* — Wenpeng Chen
(74) *Attorney, Agent, or Firm* — Maginot, Moore & Beck LLP

(57) ABSTRACT

A method for exemplar-based inpainting using a Laplacian pyramid in a multi-scale space is provided, which is capable of reflecting structural features and texture features simultaneously every time inpainting is performed. The exemplar-based inpainting method using the Laplacian pyramid in the multi-scale space includes constructing a Laplacian pyramid image including a plurality of levels using an input image and performing inpainting reflecting the structural features of a low frequency region and the texture features of a high frequency region using the Laplacian pyramid image.

7 Claims, 4 Drawing Sheets

(56) References Cited

U.S. PATENT DOCUMENTS

2012/0045095 A1* 2/2012 Tate et al. ............... 382/103
2012/0328210 A1* 12/2012 Fattal et al. .............. 382/264

OTHER PUBLICATIONS

H. Yamauchi, J. Haber, and H-P. Seidel, "Image Restoration Using Multiresolution Texture Synthesis and Image Inpainting," Computer Graphics International, 2003. Proceedings, pp. 120-125, Jul. 2003.

* cited by examiner

METHOD AND APPARATUS FOR EXEMPLAR-BASED INPAINTING IN A MULTI-SCALED SPACE USING LAPLACIAN PYRAMID

CROSS-REFERENCE TO RELATED APPLICATION

This application claims the benefit of Korean Patent Application No. 10-2012-0153119, filed on Dec. 26, 2012, in the Korean Intellectual Property Office, the disclosure of which is incorporated herein by reference.

BACKGROUND

1. Field of the Invention

The present invention relates to a method and apparatus for exemplar-based inpainting in a multi-scale space using a Laplacian pyramid, among inpainting methods for recovering a damaged portion or a portion to be removed of an image so that the recovered portion naturally matches with a remaining portion of the image.

2. Description of the Related Art

Inpainting refers to a method for recovering a damaged portion or a portion to be removed of an image so that the recovered portion naturally matches with a remaining portion of the image. Also, the inpainting may be used to remove even a normal portion or object when the normal portion or object is desired to be removed. An exemplar-based inpainting method out of various inpainting methods extracts part of a known region of an image and fills a region to be recovered with the extracted part.

Generally, an exemplar-based inpainting algorithm may iteratively perform recovery of a predetermined patch region and reconstruct an entire recovery region. Since the exemplar-based inpainting algorithm recovers a region having structural features when iterating the recovery process, plausibility may be maximized. To maximize the plausibility, the exemplar-based inpainting algorithm determines a process of selecting a recovery region to be recovered and a process of selecting a patch to fill the selected recovery region. Recovery of one cycle of the exemplar-based inpainting algorithm may be performed through the aforementioned two processes.

A conventional inpainting method used to focus on the recovery region selecting process and the patch selecting process to maximize the plausibility.

In addition, conventionally, inpainting methods use factors such as brightness, gradient, contour, a Hessian Matrix, Belief propagation, sparsity and the like. The conventional inpainting methods extract features of the factors and combine the extracted features so that structural features and texture features are naturally connected.

Therefore, the overall recovery process focuses on the recovery region selecting process and the patch selecting process to select a patch to match the recovery region best. Furthermore, the conventional inpainting methods directly use resolution of an input image.

In an image region, usually, the structural features may be distributed in a low frequency region while the texture features are distributed in a high frequency region. Therefore, when the resolution of the image is relatively low, the image is blurred and the structural features may remain over an entire screen. As the resolution is higher, the texture features are added and the image becomes clear.

The inpainting method using a multi-scale space may maintain the structural features while preserving the texture. According to conventional inpainting methods using the multi-scale space, an inpainting method fixed to one resolution divides a recovery region into several regions and process independently at proper resolution or mix patches selected from several resolutions. According to the conventional methods, it is difficult to apply the inpainting method using the multi-scale space in direct inpainting.

The exemplar-based inpainting method may not be able to obtain a natural recovered image when the structural features and the texture features are not considered together in the recovery region. When the structural features do not properly match, contents of the image may be inconsistent. When the texture features do not properly match, a boundary line of the recovery region is noticeable and therefore naturalness of the image may be reduced. In an image, the structural features are distributed usually in the low frequency region while the texture features are distributed usually in the high frequency region. Accordingly, there is a desire for a method to merge the two regions.

SUMMARY

According to an aspect of the present invention, there is provided a method for exemplar-based inpainting in a multi-scale space, the method including constructing a Laplacian pyramid image including a plurality of levels using an input image.

The exemplar-based inpainting method may include performing inpainting reflecting structural features of a low frequency region and texture features of a high frequency region using the Laplacian pyramid image.

The constructing of the Laplacian pyramid image may include downsampling an input image.

The constructing of the Laplacian pyramid image may include upsampling the downsampled image.

The constructing of the Laplacian pyramid image may include subtracting the upsampled image from the input image.

The constructing of the Laplacian pyramid image may include constructing a Laplacian pyramid including the plurality of levels by iterating the downsampling and the upsampling.

The exemplar-based inpainting method may further include performing inpainting with respect to each of the plurality of levels.

Here, the performing of the inpainting may include selecting a recovery region in each of the plurality of levels.

The performing of the inpainting may include selecting a patch in each of the plurality of levels.

The selecting of the recovery region and the selecting of the patch may include beginning selection from a lowermost level of the plurality of levels.

The selecting of the recovery region and the selecting of the patch may include performing remaining selection subject to an initial selection region after initial selection of the lowermost level.

According to another aspect of the present invention, there is provided an apparatus for exemplar-based inpainting in a multi-scale space, the apparatus including an input unit to receive an input image.

The exemplar-based inpainting apparatus may include an image processing unit to compose a Laplacian pyramid image including a plurality of levels using the input image.

The exemplar-based inpainting apparatus may include an inpainting unit to perform inpainting reflecting structural features of a low frequency region and texture features of a high frequency region using the Laplacian pyramid image.

The exemplar-based inpainting apparatus may include a patching unit to compose the Laplacian pyramid image gone through the inpainting.

The image processing unit may perform downsampling of the input image.

The image processing unit may perform upsampling of the downsampled image.

The image processing unit may perform subtracting the upsampled image from the input image.

The inpainting unit may determine a recovery object region first.

The inpainting unit may determine a patch for the recovery object region.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
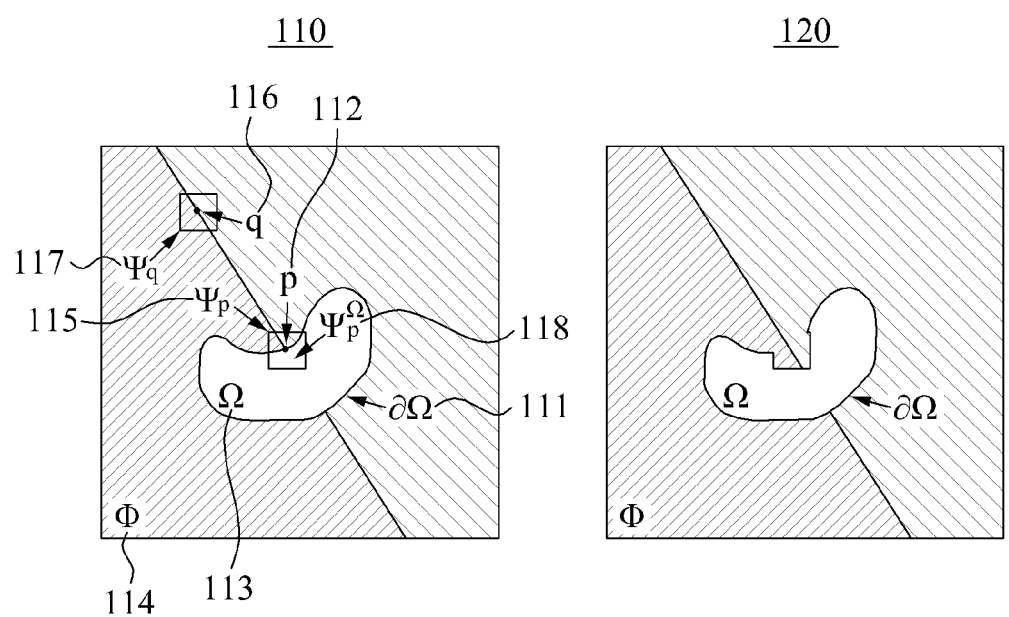
FIG. 1 is a diagram illustrating a concept of exemplar-based inpainting according to an embodiment of the present invention.

According to the embodiment of the present invention, the exemplar-based inpainting method using a Laplacian pyramid may reflect structural features and texture features simultaneously every time inpainting is performed using an image pyramid.

The exemplar-based inpainting method according to the embodiment of the present invention may directly apply conventional processes of selecting a recovery region and of selecting a patch region, and may be performed reflexively in the Laplacian pyramid.

Therefore, the inpainting method according to the embodiment of the present invention may maintain the structural features while preserving texture. Furthermore, the multi-scale space expressed by the Laplacian pyramid may enable a more natural inpainting result to be obtained and increase a processing speed.

Reference will now be made in detail to exemplary embodiments of the present invention, examples of which are illustrated in the accompanying drawings, wherein like reference numerals refer to the like elements throughout.

FIG. 1 is a diagram illustrating a concept of exemplar-based inpainting according to an embodiment of the present invention.

Inpainting refers to a method for recovering a damaged portion or a portion to be removed of an image so that the recovered portion naturally matches with a remaining portion of the image. An exemplar-based inpainting method as an example of inpainting methods extracts part of a known region of an image and fills a region to be recovered with the extracted part.

Referring to FIG. 1, in a pre-recovery region 110, an inpainting apparatus may set a recovery object region $\Psi p$ 115 which includes part of a region to be recovered $\Omega$ 113 and part of a known region $\Phi 0$ 114, at a spot p 112 of a boundary line $\partial\Omega$ 111. After the recovery object region $\Psi p$ 115 is set, a patch region $\Psi q$ 117 being in a same size and having a center point q 116 may be selected from a known image region.

Pixel values of an actual recovery region $\Psi\Omega p$ 118 may be filled using the selected patch $\Psi q$ 117. For the selected patch $\Psi q$ 117, a patch having a minimum tolerance with respect to the known region included in the recovery region may be selected. A post-recovery image 120 of FIG. 1 shows a state of after recovery of the recovery object region $\Psi p$ 115 is completed. According to the foregoing process, plausibility of the recovery region with respect to a remaining image around the boundary line may be maximized.

Since the plausibility may be varied depending on contents of the image or persons, it is difficult to set an objective standard meeting all conditions. However, in general cases of the exemplar-based inpainting, two factors may be taken into consideration to determine the plausibility. One of the two factors is structural features around the recovery region. The other one is texture features of an image of a surrounding region. The inpainting process may be defined by a function by quantifying the features. After the function is defined, a patch may be extracted by an iterative method so that the function has a maximum value, and then the recovery region may be reconstructed.

Out of the two factors applied to the inpainting, continuity of the structural features is known to be more essential for visual perception of a person. However, if the texture features are not considered in the recovery region, a natural recovered image may not be obtained. When the structural features do not properly match, the contents of the image may be inconsistent. When the texture features do not properly match, a boundary line of the recovery region may be noticeable and therefore naturalness of the image may be reduced. In general, the structural features may be distributed in a low frequency region while the texture features may be distributed in a high frequency region in an image region. Accordingly, there is a need for a method merging the two regions.

Figure 2:
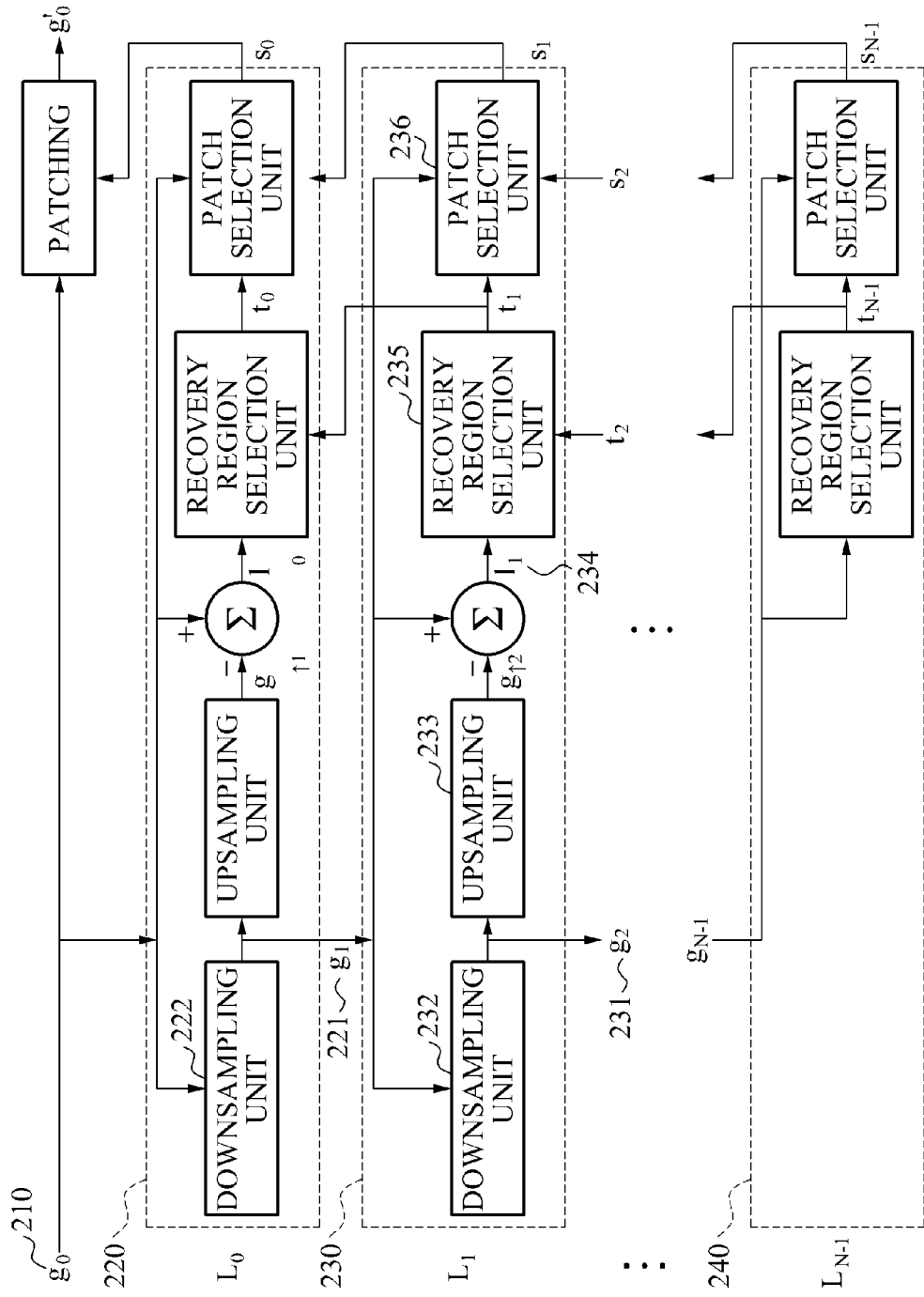
FIG. 2 is a block diagram illustrating an exemplar-based inpainting method performed in a Laplacian pyramid, according to an embodiment of the present invention.

FIG. 2 is a block diagram illustrating an exemplar-based inpainting method performed in a Laplacian pyramid, according to an embodiment of the present invention.

The exemplar-based inpainting method according to the embodiment of the present invention may reflect the structural features and the texture features simultaneously every time the inpainting is iterated.

The exemplar-based inpainting method according to the embodiment of the present invention is designed such that setting of priority and selection of the patch are performed reflexively in the Laplacian pyramid. The inpainting may be performed in various levels of resolution.

The exemplar-based inpainting method may construct the Laplacian pyramid having a multi-level structure, by iterating downsampling and upsampling. The multi-level Laplacian pyramid having a multi-scale space may be constructed using an input image and a Laplacian image. From the Laplacian pyramid, a recovered input image may be composed.

When each level of the Laplacian pyramid is downsampled at a rate of twice a level of an original image, a lowermost N-th level 240 may be reduced at a rate of 2N*2N.

Generally, during generation of the Laplacian pyramid and composition of the input image, a recovery region selection unit 235 and a patch selection unit 236 may be included for each of levels 220, 230, and 240.

The exemplar-based inpainting method may select the recovery object region and the patch region so that the structural features are connected in a low resolution region which includes only low frequency components. After selection of the recovery object region and the patch region, part of a region selected in a lower level may be selected such that the patch region naturally matches with an adjacent region of the recovery object region more and more toward a high resolution region which includes only high frequency components.

Selection of the recovery object region and the patch region may be performed from a lowermost level. A region and a patch region selected in the beginning may be recovered to a very upper level and enlarged through upsampling. Accordingly, actual size of the region at the very upper level may be enlarged by 2*2 times. The patch region selected in the lowermost level may be enlarged at a rate of 2N*2N during inpainting with respect to the input image.

For example, according to an example using a 2-level Laplacian pyramid, g0 210 may denote an input image, and g1 221 may denote a downsampled image obtained by downsampling the input image once at an uppermost level by a downsampling unit 222. Since downsampling has an effect of a low pass filter, information of only the low frequency region may remain in the downsampled image g1 221. The downsampled image g1 221 may be transferred to a second level, and then downsampled by a downsampling unit 232, thereby forming an image g2 231 of which resolution is reduced compared to the downsampled image g1 221. When the image g2 231 is upsampled by an upsampling unit 233, the image g2 231 may be blurred in comparison to the downsampled image g1 221. When the image upsampled from the image g2 231 by the upsampling unit 233 is subtracted from the downsampled image g1 221 input from the uppermost level, a Laplacian image l1 234 of the high frequency region may be obtained.

The Laplacian image l1 234 may be used for selecting the recovery region to be recovered and selecting the patch region to fill the recovery region by the recovery region selection unit 235 and the patch selection unit 236. After selection of the recovery region and the patch region to fill the recovery region, the recovery region and the patch region may be transferred to the uppermost level 220. After initial selection by the second level 230, remaining selection processes of the uppermost level 220 may be performed subject to the initial selection process.

In the uppermost level 220 as well, the Laplacian pyramid having 2 levels and the multi-scale space may be constructed by iterating the inpainting process of the second level 230. Thus, the Laplacian pyramid having the multi-scale space may compose the input image in an iterative manner.

Figure 3:
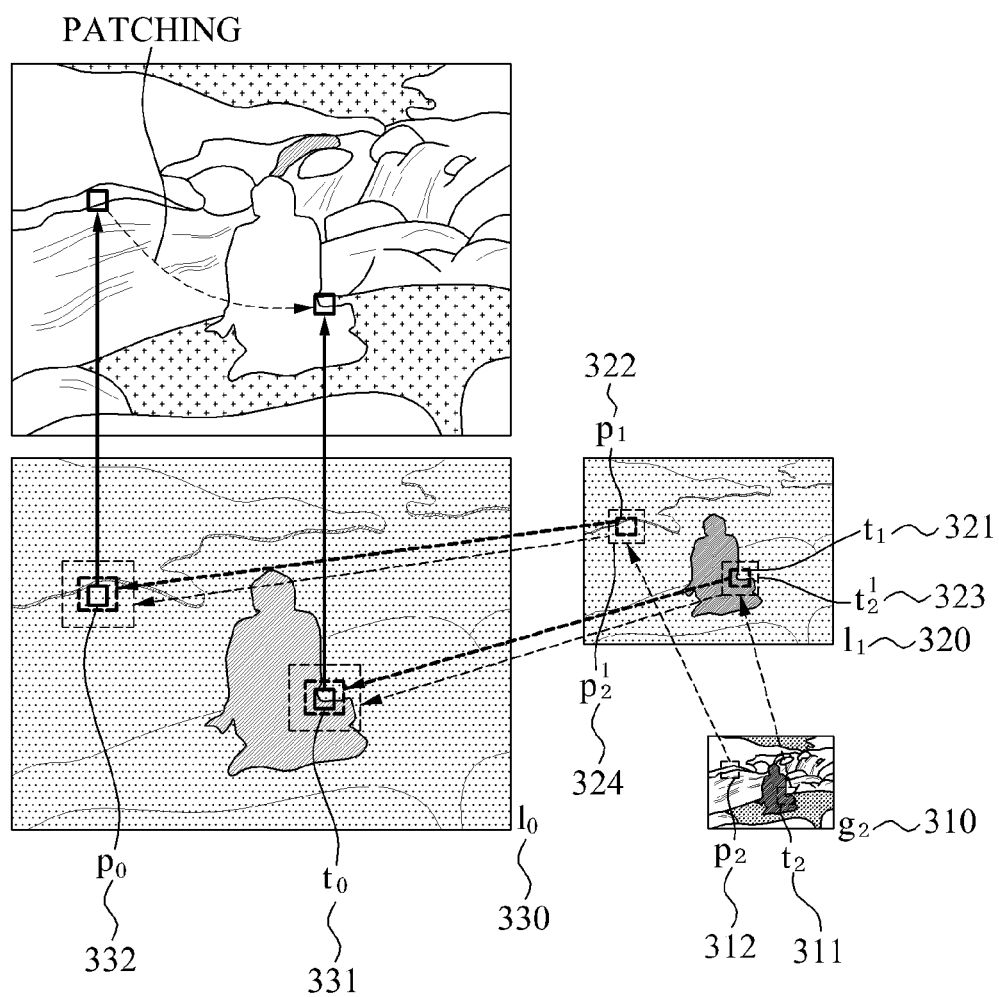
FIG. 3 is a diagram illustrating an example applying a 3-level Laplacian pyramid, according to an embodiment of the present invention.

FIG. 3 is a diagram illustrating an example applying a 3-level Laplacian pyramid, according to an embodiment of the present invention.

FIG. 3 shows the Laplacian pyramid having 3 levels. It is presumed that a recovery object region t2 311 and a patch region p2 312 are selected from a lowermost level g2 310. Those regions may be enlarged to t12 323 and p12 324, respectively, in an upper level.

The patch region selected in the lowermost level g2 310 may be selected according to structural global features present over a larger area. Therefore, match of local features present over a relatively smaller area of the upper level is ignored. Recovery of a region may be actually performed in an uppermost level. When a high frequency pattern of the patch region selected in a low frequency region does not properly match with a boundary of the recovery region, matching efficiency of the patch region may be reduced and the boundary line may be noticeable. Therefore, the recovery may be performed from the patch region selected in a lowermost level to upper levels so that the patch region matches with local structures present in respective levels.

The patch region selected in the lowermost level may be enlarged toward the upper levels. Therefore, a partial region of the enlarged patch regions may be selected again corresponding to features of the corresponding level. For the selection, the recovery region selection process and the patch region selection process applied in a lower level may be directly applied with respect to the Laplacian image of the corresponding level. However, whereas an application region of the lowermost level is an entire image region, an application region of the upper level may be only an enlarge region of a region selected from a very lower level.

For example, the recovery object region t2 311 and the patch region p2 312 selected in the lowermost region g 310 may be enlarged by four times to the regions t12 323 and p12 324 in a level l1 320. In the level l1 320, the recovery region selection process and the patch region selection process may be performed in the same manner as in a lower level to the regions t12 323 and p12 324, thereby selecting new regions t1 321 and p1 322. The method may be applied up to an uppermost differential image and may select regions t0 331 and p0 332. After the regions t0 331 and p0 332 are selected, the region t0 331 may be recovered using the region p0 332 in the input image. Since the input image and the differential image are in the same size, the regions t0 331 and p0 332 may be directly applied to the recovery object region.

Referring to the example shown in FIG. 3, the inpainting may be performed with respect to a first recovery region, that is, the recovery object region t2 311, selected in the lowermost level image g2 310 of the Laplacian pyramid using the patch region p2 312 selected in the entire region of the lowermost level image g2 310.

Additionally, referring to the example of FIG. 3, the inpainting may be performed using the patch region t12 323 corresponding to the first recovery region t2 311 in the upper level image l1 320 of the lowermost level image g2 310.

Since inpainting of each level is performed using frequency components of only a corresponding band, a partial region may be selected so that characteristics of the lower level are satisfied while features of the level are naturally maintained. The patch selected according to the foregoing method may patch such that entire features and the local features expressing details are properly assigned. Accordingly, the image may be recovered more naturally. When patching using the Laplacian pyramid is completed once, a pyramid region corresponding to the recovered portion may be updated. After the update, the foregoing process may be iterated until the inpainting is completed.

Figure 4:
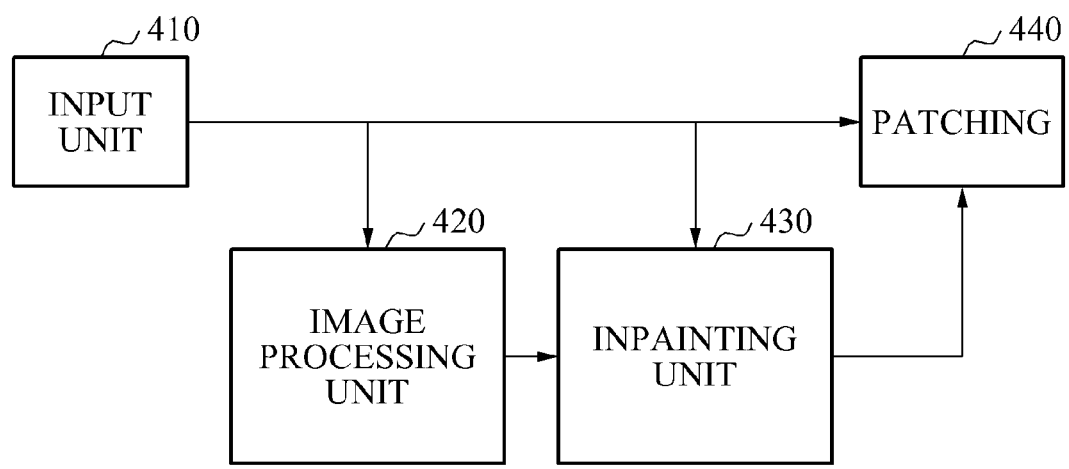
FIG. 4 is a diagram illustrating an exemplar-based inpainting apparatus using a Laplacian pyramid in a multi-scale space, according to an embodiment of the present invention.

FIG. 4 is a diagram illustrating a configuration of an exemplar-based inpainting apparatus for a multi-scale space according to an embodiment of the present invention.

The exemplar-based inpainting apparatus for a multi-scale space may include an input unit 410, an image processing unit 420, an inpainting unit 430, and a patching unit 440.

The input unit 410 may receive an input image and transfer the input image to the image processing unit 420, the inpainting unit 430, and the patching unit 440.

The input image transferred to the image processing unit 420 may be downsampled and transferred to a lower level. The downsampled image may be upsampled back and subtracted from the input image.

With respect to the input image transferred to the inpainting unit 430, a recovery object region is determined and a patch for the recovery object region is selected.

The input image transferred to the patching unit 440 may be synthesized with the Laplacian image recovered by the inpainting unit 430.

The image processing unit 420 may include a plurality of levels. The operation of the image processing unit 420 may begin from a lowermost level and may be iterated in each level, thereby forming the Laplacian pyramid image including the plurality of levels. The image processing unit 420 may downsample the input image. The dowsampled image may be upsampled. The Laplacian pyramid image may be obtained by subtracting the upsampled image from the input image. The Laplacian pyramid image may be transferred to the inpainting unit 430.

The inpainting unit 430 may include a plurality of levels. The inpainting may be performed from a lowermost level. The Laplacian pyramid image of each of the plurality of levels, being transferred from the image processing unit 420, may be inpainted according to the levels. By iterating the inpainting the Laplacian pyramid image with respect to each level, the Laplacian pyramid image including the plurality of levels may be obtained.

Using the Laplacian pyramid image transferred from the image processing unit 420, inpainting may be performed reflecting the structural features of the low frequency region and the texture features of the high frequency region.

Priority may be determined with respect to the recovery object region so that recovery is performed from a region having relatively strong structural features. The exemplar-based inpainting algorithm may iterate recovery of a predetermined patch region. Through the iteration, an entire part of the recovery object region may be reconstructed. During iteration of the recovery, a region including the structural features may be recovered first so that plausibility may be maximized.

With respect to the selected recovery region, a patch to fill the recovery region may be selected. The inpainting unit 430 may be configured such that setting of the priority and selection of the patch region are performed reflexively in the Laplacian pyramid. The inpainting method according to the present embodiment may be performed in various levels of resolution.

The inpainting unit 430 may select the recovery object region and the patch region so that the structural features are connected in a low resolution region which includes only low frequency components. After selection of the patch region in the low resolution region, part of a region selected in a lower level may be selected such that the patch region naturally matches with an adjacent region of the recovery object region more and more toward a high resolution region which includes only high frequency components.

The patching unit 440 may synthesize the Laplacian pyramid image recovered through the image processing unit 420 and the inpainting unit 430 and the input image.

The Laplacian pyramid image obtained through inpainting at each level may perform patching such that entire features and the local features expressing details are properly assigned. Accordingly, the image may be recovered more naturally. When patching using the Laplacian pyramid is completed once, a pyramid region corresponding to the recovered portion may be updated. After the update, the foregoing process may be iterated until the inpainting is completed.

| Algorithm 1 Recursive Inpainting |
| --- |
| *Building: build N layered Laplacian image pyramid<br>While $(\Omega_0 \neq 0)$ do<br>  *Initializing: $t_{\uparrow N} \leftarrow g_{N-1}, s_{\uparrow N} \leftarrow \Phi_{N-1}$<br>  *Selecting:<br>  for (n=N − 1 ; n ≥ 0 ; n←n − 1) do<br>    Find $p_r$ and $t_n$ of max{P(p)} for $\forall p \in \{t_{\uparrow(n+1)} \cap \partial \Omega n\}$<br>    Find $p_s$ and $s_n$ of max{S(p)} for $\forall p \in s\uparrow_{(n+1)}$<br>    If(n > 0) find $t_{\uparrow n}$ and $s_{\uparrow n}$ on $L_{n-1}$ from $t_n$ and $s_n$<br>  end for<br>  *Patching: copy $s_0$ onto $t_0^\Omega$<br>  *Updating: pyramid g*and l* for $\forall p \in t^\Omega$<br>end while |

<Table 1> indicates a reflexive inpainting algorithm occurring in a Laplacian pyramid, using a virtual code.

Through the exemplar-based inpainting method using a Laplacian pyramid in a multi-scale space according to the embodiment of the present invention, not only structural features but also texture features of the recovered image may be naturally reconstructed. Furthermore, processing speed may be increased. When a patch is selected according to a conventional method, the process may be iterated with respect to the entire image region at a highest resolution every time. However, according to the embodiment of the present invention, initial selection is performed in a reduced image and remaining selection is performed subject to the initial selection. Accordingly, although the algorithm is iterated as many times as a number of the levels of the Laplacian pyramid, the processing speed may be rather increased.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

Accordingly, other implementations are within the scope of the following claims.

What is claimed is:

1. A method for exemplar-based inpainting in a multi-scale space, the method comprising:
   constructing a Laplacian pyramid image including a plurality of levels using an input image; and
   performing inpainting reflecting structural features of a low frequency region and texture features of a high frequency region using the Laplacian pyramid image,
   wherein the performing of inpainting comprises,
      determining a first recovery region as a recovery object region and selecting a first patch which is corresponding to have a minimum tolerance with respect to the first recovery region, in an entire region of a first level of the Laplacian pyramid image
      determining a second recovery region as the recovery object region from upsampled first recovery region and selecting a second patch which is corresponding to have a minimum tolerance with respect to the second recovery region, in a second level of the Laplacian pyramid image which is upper level of the first level of the Laplacian pyramid image; and
      patching the second recovery region, which is determined as the recovery object region, with the second patch.

2. The method of claim 1, wherein the constructing of the Laplacian pyramid image comprises:
   downsampling an input image;
   upsampling the downsampled image; and
   subtracting the upsampled image from the input image.

3. The method of claim 2, wherein the constructing of the Laplacian pyramid image comprises:
   constructing a Laplacian pyramid including the plurality of levels by iterating the downsampling and the upsampling.

4. The method of claim 1, further comprising repeating from a lowermost level image to an uppermost level image, selecting the first patch from the entire region of a first level of the Laplacian pyramid image and selecting a second patch from an upsampled first patch.

5. An apparatus for exemplar-based inpainting in a multi-scale space, the apparatus comprising:
   a receiver configured to receive an input image; and
   an image processor configured to compose a Laplacian pyramid image including a plurality of levels using the input image;
   an inpainter configured to determine a first recovery region as a recovery object region, to select a first patch which is corresponding to have a minimum tolerance with respect to the first recovery region, in an entire region of a first level of the Laplacian pyramid image, to determine a second recovery region as the recovery object region from upsampled first recovery region and to select a second patch which is corresponding to have a minimum tolerance with respect to the second recovery region, in a second level of the Laplacian pyramid image which is upper level of the first level of the Laplacian pyramid image; and
   a patcher configured to patch the second recovery region, which is determined as the recovery object region, with the second patch.

6. The apparatus of claim 5, wherein the image processor performs downsampling of the input image, upsampling of the downsampled image, and subtracting the upsampled image from the input image.

7. The apparatus of claim 5, wherein the inpainter configured to repeat from a lowermost level image to an uppermost level image, selecting the first patch from the entire region of a first level of the Laplacian pyramid image and selecting a second patch from an upsampled first patch.

* * * * *